United States Patent
Okita et al.

(10) Patent No.: US 7,868,979 B2
(45) Date of Patent: Jan. 11, 2011

(54) LIQUID CRYSTAL DISPLAY DEVICE

(75) Inventors: Mitsutaka Okita, Hakusan (JP);
Kazuhiro Nishiyama, Kanazawa (JP);
Shigesumi Araki, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 112 days.

(21) Appl. No.: 12/270,392

(22) Filed: Nov. 13, 2008

(65) Prior Publication Data
US 2009/0066899 A1 Mar. 12, 2009

Related U.S. Application Data

(63) Continuation of application No. PCT/JP2008/054641, filed on Mar. 13, 2008.

(30) Foreign Application Priority Data

Mar. 13, 2007 (JP) ............................. 2007-063693

(51) Int. Cl.
*G02F 1/1335* (2006.01)
(52) U.S. Cl. .................. 349/119; 349/120; 349/130
(58) Field of Classification Search .................. None
See application file for complete search history.

(56) References Cited

U.S. PATENT DOCUMENTS

| | | | | |
|---|---|---|---|---|
| 7,126,754 B2 * | 10/2006 | Yamaoka et al. | ............ | 359/485 |
| 7,423,715 B2 * | 9/2008 | Hisatake | ..................... | 349/119 |
| 2004/0246417 A1 * | 12/2004 | Matsushima | ................. | 349/114 |
| 2005/0162592 A1 * | 7/2005 | Hirakata et al. | ............. | 349/119 |
| 2005/0179842 A1 * | 8/2005 | Ichihashi | ..................... | 349/117 |
| 2005/0275780 A1 * | 12/2005 | Hisatake | ..................... | 349/120 |
| 2006/0215093 A1 | 9/2006 | Nakao et al. | | |
| 2006/0221283 A1 | 10/2006 | Nakao et al. | | |

FOREIGN PATENT DOCUMENTS

| | | |
|---|---|---|
| JP | 3118197 B2 | 12/2000 |
| JP | 2005-164742 | 6/2005 |
| JP | 2005-164759 | 6/2005 |
| JP | 2005-164759 A | 6/2005 |
| JP | 2006-251143 A | 9/2006 |
| JP | 2007-025629 A | 2/2007 |

* cited by examiner

*Primary Examiner*—Tina M Wong
(74) *Attorney, Agent, or Firm*—Oblon, Spivak, McClelland, Maier & Neustadt, L.L.P.

(57) ABSTRACT

A liquid crystal display device includes a liquid crystal display panel to which an OCB mode is applied, and an optical compensation element which optically compensates a retardation of the liquid crystal layer in a predetermined display state in which a voltage is applied to the liquid crystal layer. The optical compensation element includes a polarizer, a first retardation plate which is disposed between the polarizer and the liquid crystal display panel and in which discotic liquid crystal molecules are fixed in a state in which the discotic liquid crystal molecules are hybrid-aligned along a normal direction, and a second retardation plate which is disposed between the polarizer and the first retardation plate and has wavelength dispersion characteristics which are opposite to wavelength dispersion characteristics of an in-plane retardation in the liquid crystal layer.

17 Claims, 4 Drawing Sheets

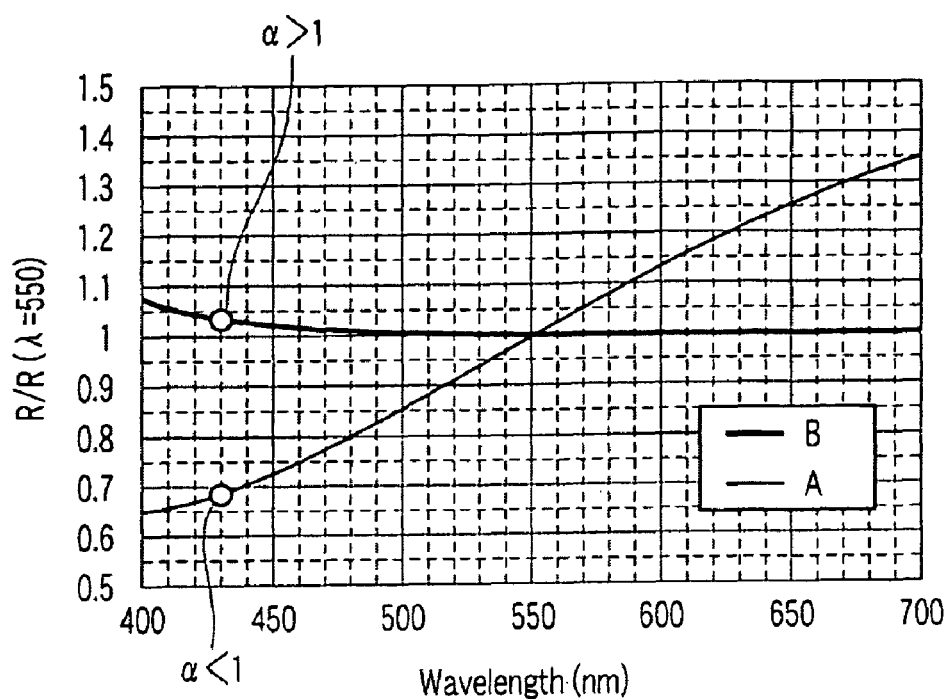
F I G. 5
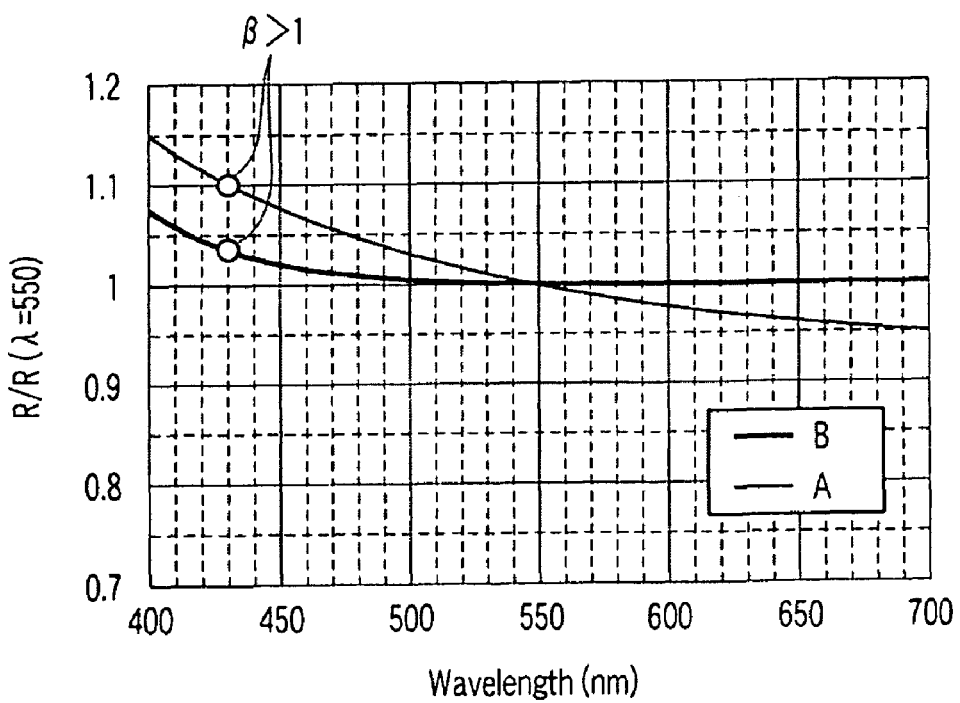
F I G. 6

| | Present embodiment | Comparative example |
|---|---|---|
| Wavelength dispersion parameter | α=0.68<br>β=1.10 | α=1.04<br>β=1.04 |
| Chromaticity difference at 60° to the left and righ ($|\Delta v'|$) | 0.04 | 0.20 |
| Chromaticity difference at 60° to the left and righ ($|\Delta u'|$) | 0.018 | 0.06 |

LIQUID CRYSTAL DISPLAY DEVICE

CROSS REFERENCE TO RELATED APPLICATIONS

This is a Continuation Application of PCT Application No. PCT/JP2008/054641, filed Mar. 13, 2008, which was published under PCT Article 21(2) in Japanese.

This application is based upon and claims the benefit of priority from prior Japanese Patent Application No. 2007-063693, filed Mar. 13, 2007, the entire contents of which are incorporated herein by reference.

BACKGROUND OF THE INVENTION

1. Field of the Invention

The present invention relates to a liquid crystal display device, and more particularly to a liquid crystal display device using an optically compensated bend (OCB) alignment technique which can realize a wide viewing angle and a high response speed.

2. Description of the Related Art

Liquid crystal display devices have been applied to various fields by taking advantage of their features such as light weight, small thickness and low power consumption.

In recent years, attention has been paid to a liquid crystal display device, to which the OCB mode is applied, as a liquid crystal display device which can improve the viewing angle and response speed. The OCB mode liquid crystal display device is configured such that a liquid crystal layer including liquid crystal molecules, which are bend-aligned in a state in which a predetermined voltage is applied, is held between a pair of substrates. Compared to a twisted nematic (TN) mode, the OCB mode is advantageous in that the response speed can be increased and the viewing angle can be increased since the effect of birefringence of light, which passes through the liquid crystal layer, can optically be self-compensated by the alignment state of liquid crystal molecules.

There has been proposed an optical compensation sheet including hybrid-aligned discotic liquid crystal molecules, as an optical sheet for further improving the viewing angle characteristics in the liquid crystal display device to which the OCB mode is applied (see, e.g. U.S. Pat. No. 3,118,197).

In the above-described OCB mode liquid crystal display device, there is a problem that the hue varies depending on the direction in which the screen is viewed. Specifically, in the state in which a black image is displayed by applying a predetermined voltage to the liquid crystal layer, if the viewing angle is gradually increased from the normal direction of the screen along a direction perpendicular to the rubbing direction of the alignment film, a black image is colored. At this time, for example, if the rubbing direction is a vertical direction of the screen, the hue is different between the case of increasing the viewing angle from the normal direction toward the right side of the screen and the case of increasing the viewing angle from the normal direction toward the left side. For example, the black image becomes reddish on the right side of the screen, and the black image becomes bluish on the left side of the screen.

BRIEF SUMMARY OF THE INVENTION

The present invention has been made in consideration of the above-described problem, and the object of the invention is to provide a liquid crystal display device to which an OCB mode is applied, wherein unwanted coloring of a screen is improved at a time of viewing the screen in an oblique direction. In addition, the object of the invention is to provide a liquid crystal display device to which an OCB mode is applied, wherein asymmetry of hue due to the direction of the viewing angle is improved and the display quality is good.

According to an aspect of the present invention, there is provided a liquid crystal display device comprising: a liquid crystal display panel which is configured to include a liquid crystal layer held between a pair of substrates, and to which an OCB mode is applied; and an optical compensation element which is disposed on an outer surface of the liquid crystal display panel and which optically compensates a retardation of the liquid crystal layer in a predetermined display state in which a voltage is applied to the liquid crystal layer, the optical compensation element including: a polarizer; a first retardation plate which is disposed between the polarizer and the liquid crystal display panel and in which discotic liquid crystal molecules are fixed in a state in which the discotic liquid crystal molecules are hybrid-aligned along a normal direction; and a second retardation plate having wavelength dispersion characteristics of $\alpha 1 < 1$, when a ratio of an in-plane retardation Re430 at a wavelength of 430 nm to an in-plane retardation Re550 at a wavelength of 550 nm is $\alpha 1$.

The present invention can provide a liquid crystal display device to which an OCB mode is applied, wherein unwanted coloring of a screen is improved at a time of viewing the screen in an oblique direction, and can provide a liquid crystal display device to which an OCB mode is applied, wherein asymmetry of hue due to the direction of the viewing angle is improved and the display quality is good.

BRIEF DESCRIPTION OF THE SEVERAL VIEWS OF THE DRAWING

FIG. 5 is a graph for explaining wavelength dispersion characteristics of an in-plane retardation of a retardation plate which is applicable to the liquid crystal display device shown in FIG. 1;

FIG. 6 is a graph for explaining wavelength dispersion characteristics of a normal-directional retardation of a retardation plate which is applicable to the liquid crystal display device shown in FIG. 1;

DETAILED DESCRIPTION OF THE INVENTION

A liquid crystal display device according to an embodiment of the invention will now be described with reference to the accompanying drawings. A description is given of, as an example of the liquid crystal display device, a transmissive liquid crystal display device which is configured such that one pixel is composed of only a transmissive part that displays an image by selectively transmitting backlight. However, with use of other liquid crystal display devices to which an OCB mode is applied, such as a reflective liquid crystal display device which is configured such that one pixel is composed of only a reflective part that displays an image by selectively reflecting ambient light, and a transflective liquid crystal display device in which one pixel includes both a reflective part and a transmissive part, the same advantageous effects can be obtained on the basis of the embodiment which will be described below.

Figure 1:
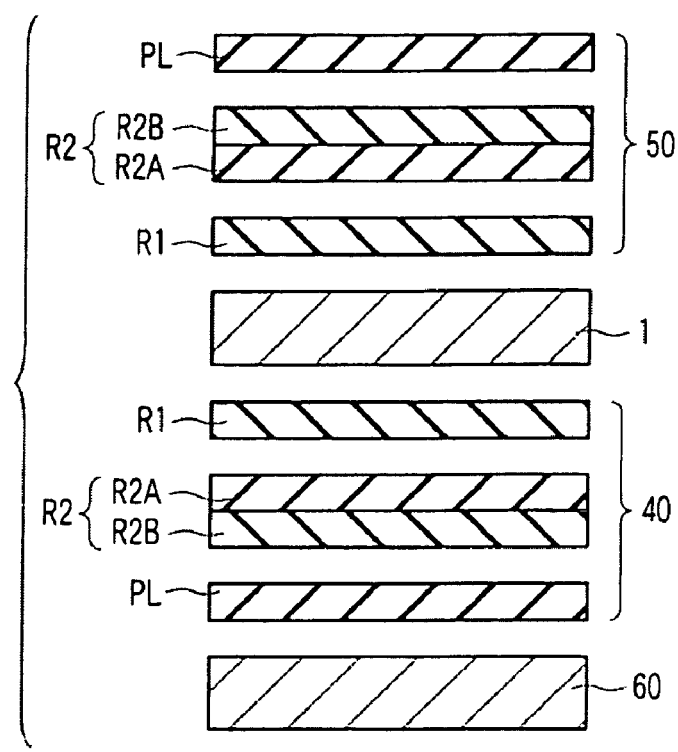
FIG. 1 schematically shows the structure of a liquid crystal display device according to an embodiment of the present invention.

As shown in FIG. 1, the liquid crystal display device includes a liquid crystal display panel 1 to which an OCB mode is applied, a backlight 60 which illuminates the liquid crystal display panel 1, a first optical compensation element 40 which is disposed between the liquid crystal display panel 1 and backlight 60, and a second optical compensation element 50 which is disposed on an observation side of the liquid crystal display panel 1.

Figure 2:
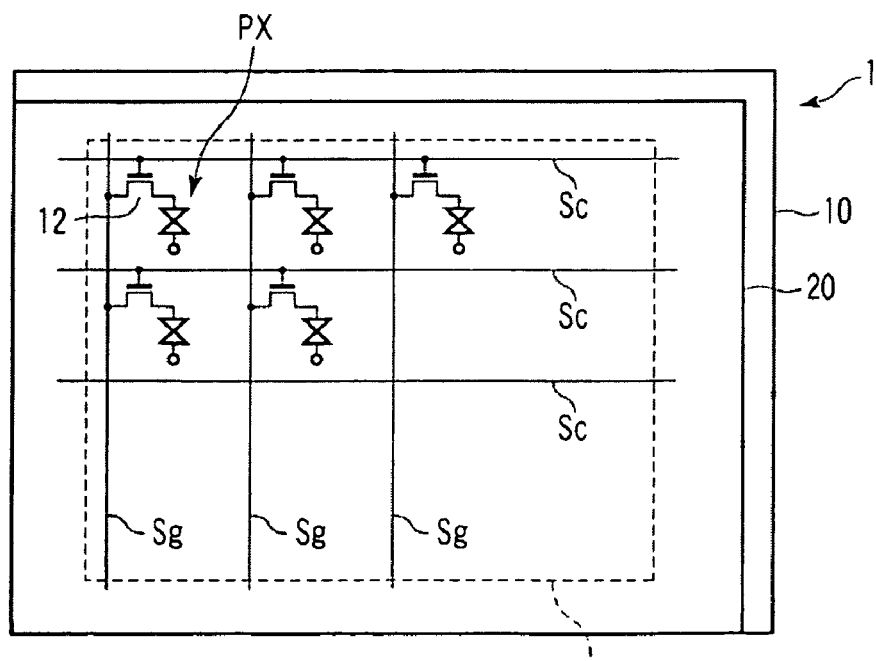
FIG. 2 schematically shows the structure of a liquid crystal display panel which is applicable to the liquid crystal display device shown in FIG. 1.
Figure 3:
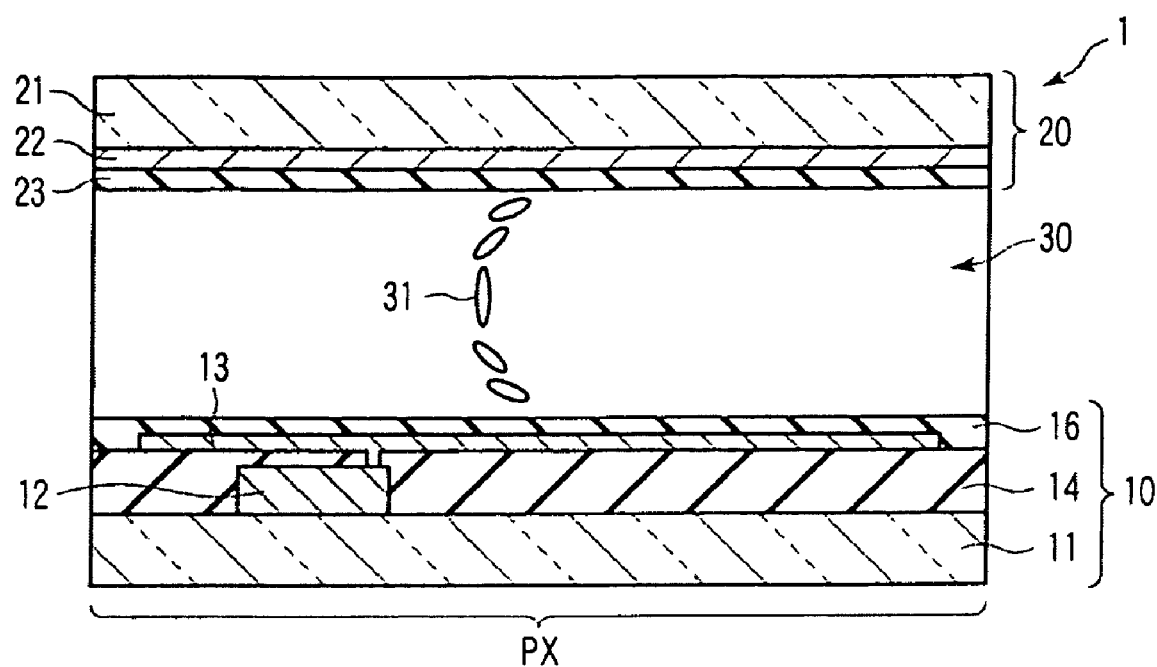
FIG. 3 schematically shows the structure of an OCB mode liquid crystal display panel which is applicable to the liquid crystal display device shown in FIG. 1.

As shown in FIG. 2 and FIG. 3, the liquid crystal display panel 1 is configured such that a liquid crystal layer 30 is held between a pair of substrates, namely, an array substrate 10 and a counter-substrate 20, and the liquid crystal display panel 1 includes an active area DSP that displays an image. The active area DSP is composed of a plurality of display pixels PX which are arrayed in a matrix.

The array substrate 10 is formed by using a light-transmissive insulating substrate 11 of, e.g. glass. The array substrate 10 includes, on one major surface of the insulating substrate 11, a plurality of scanning lines Sc which are disposed along a row direction of the display pixels PX; a plurality of signal lines Sg which are disposed along a column direction of the display pixels PX; switch elements 12 which are disposed in association with the respective display pixels PX near intersections between the scanning lines Sc and signals lines Sg; pixel electrodes 13 which are connected to the switch elements 12 and are disposed in association with the respective display pixels PX; and an alignment film 16 which is disposed in a manner to cover the entire surface of the insulating substrate 11.

The switch element 12 is composed of, e.g. a thin-film transistor (TFT). The pixel electrode 13 is disposed on an insulation film 14 and is electrically connected to the switch element 12. The pixel electrode 13 is formed of a light-transmissive electrically conductive material such as indium tin oxide (ITO).

The counter-substrate 20 is formed by using a light-transmissive insulating substrate 21 of, e.g. glass. The counter-substrate 20 includes a counter-electrode 22 which is disposed on one major surface of the insulating substrate 21 in common with the plural display pixels PX, and an alignment film 23 which is disposed so as to cover the entire major surface of the insulating substrate 21. The counter-electrode 22 is formed of a light-transmissive electrically conductive material such as ITO.

The array substrate 10 and counter-substrate 20 having the above-described structures are disposed with a predetermined gap therebetween via a spacer (e.g. a columnar spacer which is integrally formed on one of the substrates) and are attached to each other by a sealant. The liquid crystal layer 30 is sealed in the gap between the array substrate 10 and counter-substrate 20.

In this embodiment, the liquid crystal display panel 1 is configured such that an OCB mode is applied to the liquid crystal display panel 1. The liquid crystal layer 30 is formed of a material including liquid crystal molecules 31 which have positive dielectric constant anisotropy and optically positive uniaxiality. In this liquid crystal layer 30, in a predetermined display state in which a voltage is applied to the liquid crystal layer 30, the liquid crystal molecules 31 are bend-aligned between the array substrate 10 and counter-substrate 20.

The first optical compensation element 40 and second optical compensation element 50 have a function of optically compensating the retardation of the liquid crystal layer 30 in a predetermined display state in which a voltage is applied to the liquid crystal layer 30 in the above-described liquid crystal display panel 1. Specifically, as shown in FIG. 1, the first optical compensation element 40 is disposed on the outer surface of the array substrate 10, and the second optical compensation element 50 is disposed on the outer surface of the counter-substrate 20. The first optical compensation element 40 and second optical compensation element 50 have substantially the same structure, and each of the first optical compensation element 40 and second optical compensation element 50 is configured to include a polarizer PL, a first retardation plate R1 and a second retardation plate R2.

The polarizer PL is configured such that a polarizing layer, which is formed of, e.g. polyvinyl alcohol (PVA), is held between a pair of support layers which are formed of, e.g. triacetate cellulose (TAC). The polarizer PL has a transmission axis and an absorption axis which are substantially perpendicular to each other.

The first retardation plate R1 is disposed between the polarizer PL and the liquid crystal display panel 1, and has a fast axis and a slow axis which are substantially perpendicular to each other. The first retardation plate R1 is an anisotropic film which compensates retardation of the liquid crystal layer 30, and a WV film (manufactured by FUJIFILM Corporation) is applicable. The WV film is a liquid crystal film in which discotic liquid crystal molecules, each having optically negative, uniaxial refractive index anisotropy, are fixed in the state in which the discotic liquid crystal molecules are hybrid-aligned along the normal direction in the liquid crystal state.

The second retardation plate R2 is disposed between the polarization PL and the first retardation plate R1. In the example shown in FIG. 1, the second retardation plate R2 includes a first retardation layer R2A and a second retardation layer R2B, but these layers may be integrally structured, as will be described later.

The first retardation layer R2A is composed of an A-plate so as to have an in-plane retardation. The first retardation layer R2A has a refractive index anisotropy of nx>ny≈nz (optically positive) or nz≈nx>ny (optically negative), where nx and ny are refractive indices in mutually perpendicular directions in its plane, and nz is a refractive index in its normal direction. In addition, the second retardation layer R2B is composed of a C-plate so as to have a normal-directional retardation, and has a refractive index anisotropy of nx≈ny<nz (optically positive) or nx≈ny>nz (optically negative).

Figure 4:
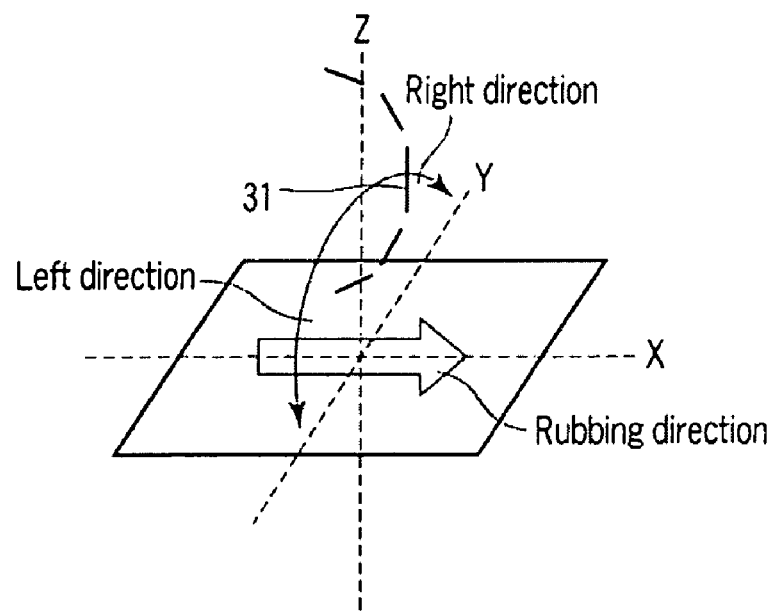
FIG. 4 is a view for explaining the definitions of axis angles to a rubbing direction of an alignment film in the liquid crystal display device shown in FIG. 1.

In the above-described liquid crystal display device, the respective structural parts are disposed, for example, with the following axis angles, with the rubbing direction of the alignment film 16 of the array substrate 10 and the alignment film 23 of the counter-substrate 20 being set as a reference direction. The axis angles are angles of the absorption axis of the polarizer and the slow axis of the retardation plate, which are formed counterclockwise relative to the reference direction (X axis), and are defined as shown in FIG. 4. Specifically, when the liquid crystal display device is observed from the counter-substrate 20 side, an X axis and a Y axis, which are perpendicular to each other, are defined, for the purpose of convenience, in a plane that is parallel to the major surface of the array substrate 10 (or counter-substrate 20), and a normal direction to this plane is defined as a Z axis. The term "in a plane" means "in a plane" which is defined by the X axis and Y axis.

For example, the rubbing direction is set at 0° azimuth. In the array substrate-side first optical compensation element 40, the polarizer PL is disposed such that its transmission axis is set at 1350 azimuth. The first retardation plate R1 is disposed such that its slow axis is set at 90° azimuth, which is perpendicular to the rubbing direction so as to compensate the retardation of the liquid crystal layer 30. The first retardation layer R2A of the second retardation plate R2 is disposed, for example, such that its slow axis is set at 135° azimuth, which substantially agrees with the transmission axis of the polarizer PL. On the other hand, in the counter-substrate-side second optical compensation element 50, the polarizer PL is disposed such that its transmission axis is set at 450 azimuth. The first retardation plate R1 is disposed such that its slow axis is set at 90° azimuth, which is perpendicular to the rubbing direction so as to compensate the retardation of the liquid crystal layer 30. The first retardation layer R2A of the second retardation plate R2 is disposed, for example, such that its slow axis is set at 450 azimuth, which substantially agrees with the transmission axis of the polarizer PL.

As regards the first optical compensation element 40 and second optical compensation element 50, the retardation values of the respective structural parts are as follows. The retardation values indicated below are those at the wavelength of 550 nm. The retardation value of the first retardation plate R1 is 30 nm. The retardation value (in-plane retardation) Re550 of the first retardation layer R2A of the second retardation plate R2 is 40 nm, and the retardation value (thickness-directional (normal-directional) retardation) Rth550 of the second retardation layer R2B is 170 nm. In this example, the retardation values of the structural parts, which are disposed with the liquid crystal layer 30 interposed, are set to be equal, but the invention is not limited to this example.

In the liquid crystal display device to which the OCB mode is applied, as shown in FIG. 4, the liquid crystal molecules 31 are bend-aligned in an X-Y plane in a predetermined voltage application state (e.g. black display state).

In the prior art, coloring occurs even on the screen of black display, with different hues, in the case where the viewing angle is increased from the normal direction (i.e. Z-axis direction) of the screen toward the 90° azimuth in the X-Y plane, and in the case where the viewing angle is increased toward the 270° azimuth in the X-Y plane. The reason for this is as follows. In the case where the screen is viewed from the side of 90° azimuth, the liquid crystal molecules 31 are aligned from the lower side (array substrate side) toward the upper side (counter-substrate side) in a counter-clockwise direction (i.e. left-hand direction). In the case where the screen is viewed from the side of 270° azimuth, the liquid crystal molecules 31 are aligned from the lower side toward the upper side in a clockwise direction (i.e. right-hand direction). Thus, the polarization state varies due to the effect of the optical rotating power of light which passes through the liquid crystal layer 30.

By the above-described structure, the inventors solve the problems of the coloring and the difference in hue due to the viewing angle direction.

Specifically, the liquid crystal molecules 31 of the liquid crystal layer 30 in the black display state are aligned in a relatively upright state. Considering that sufficient compensation cannot be effected with only the first retardation plate R1 in the case of viewing in an oblique direction, the second retardation layer R2B, which has the relationship of refractive indices, $nx \approx ny \neq nz$, is disposed, thereby compensating the retardation of the liquid crystal layer 30 even in the case of viewing in an oblique direction. Further, the first retardation layer R2A, which has the relationship of refractive indices, $nx > ny \approx nz$, is disposed so as to eliminate the effect of the optical rotating power in the case of viewing in an oblique direction.

In addition, the respective wavelength dispersion characteristics are set as follows. A normalized retardation R, in this specification, means a normalized retardation R/R ($\lambda$=550) at respective wavelengths at a time when normalization is effected at the wavelength of 550 nm.

To begin with, as regards the thickness-directional retardation Rth of the liquid crystal layer 30, the normalized retardation R/R ($\lambda$=550) of the liquid crystal layer 30 in the black display state has wavelength dispersion characteristics with such a negative inclination that the normalized retardation R/R ($\lambda$=550) is greater than 1 on the short wavelength side and is less than 1 on the long wavelength side. Thus, in the second retardation layer R2B, the normalized retardation Rth/Rth ($\lambda$=550) is set to be greater than 1 on the short wavelength side, so as to follow the characteristics of the normalized retardation R/R ($\lambda$=550) of the liquid crystal layer 30. Specifically, when the ratio of the retardation Rth430 at the wavelength of 430 nm to the retardation Rth550 at the wavelength of 550 nm is $\beta 1$, the second retardation layer R2B has such wavelength dispersion characteristics as to have a negative inclination which is set at $\beta 1 > 1$. Preferably, when the ratio of the retardation Rth625 at the wavelength of 625 nm to the retardation Rth550 at the wavelength of 550 nm is $\beta 2$, the second retardation layer R2B should have wavelength dispersion characteristics of $\beta 2 < 1$. By using the second retardation layer R2B which meets this condition, sufficient optical compensation can be effected in a range from short wavelengths to long wavelengths.

The first retardation layer R2A eliminates the effect of optical rotating power in the case of viewing in an oblique direction, as described above. In order to differentiate the effects on respective wavelengths and to finally equalize the hue, the normalized retardation Re/Re ($\lambda$=550) is set to be less than 1 on the short wavelength side so as to have opposite characteristics to the normalized retardation Re/Re ($\lambda$=550) of the liquid crystal layer 30. Specifically, when the ratio of the retardation Re430 at the wavelength of 430 nm to the retardation Re550 at the wavelength of 550 nm is $\alpha 1$, the first retardation layer R2A has such wavelength dispersion characteristics as to have a positive inclination which is set at $\alpha 1 < 1$. Preferably, when the ratio of the retardation Re625 at the wavelength of 625 nm to the retardation Re550 at the wavelength of 550 nm is $\alpha 2$, the first retardation layer R2A should have wavelength dispersion characteristics of $\alpha 2 > 1$. By using the first retardation layer R2A which meets this condition, the difference in hue due to the viewing angle direction can be eliminated.

Next, the advantageous effects of the structure of the present embodiment have been verified. In the structure of the present embodiment, each of the first optical compensation element 40 and second optical compensation element 50 has the second retardation plate R2. The first retardation layer R2A has wavelength dispersion characteristics of the retardation Re as indicated by a solid line A in FIG. 5. In addition, the second retardation layer R2B has wavelength dispersion characteristics of the retardation Rth as indicated by a solid line A in FIG. 6. As regards the first retardation layer R2A, the following setting was made: $\alpha 1 = 0.68$, and $\alpha 2 = 1.20$. As regards the second retardation layer R2B, the following setting was made: $\beta 1 = 1.10$, and $\beta 2 = 0.97$.

In a comparative example, each of the first optical compensation element 40 and second optical compensation element 50 has the second retardation plate R2. The first retardation layer R2A has wavelength dispersion characteristics of the retardation Re as indicated by a solid line B in FIG. 5. In addition, the second retardation layer R2B has wavelength dispersion characteristics of the retardation Rth as indicated by a solid line B in FIG. 6. As regards the first retardation layer R2A, the following setting was made: $\alpha 1=1.04$, and $\alpha 2=1.00$. As regards the second retardation layer R2B, the following setting was made: $\beta 1=1.04$, and $\beta 2=1.00$.

Figures 7, 8:
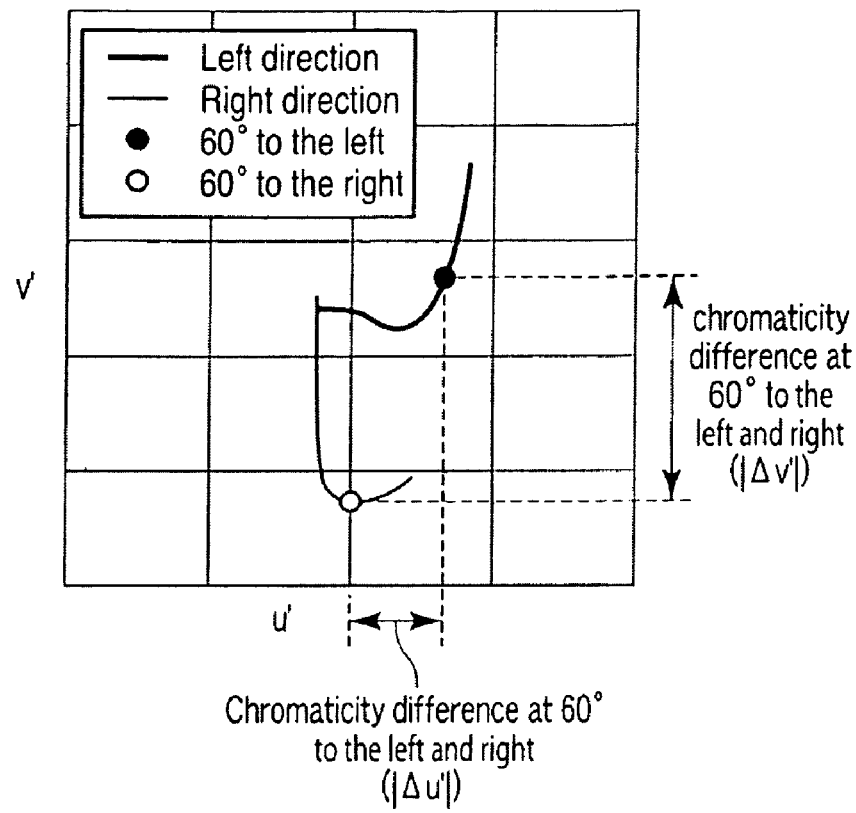
FIG. 7 is a graph showing a chromaticity variation due to an increase of the viewing angle in a black display state in a CIE 1976 UCS chromaticity diagram.
FIG. 8 is a table showing structures of liquid crystal display devices and measurement results of chromaticity differences thereof in the embodiment and a comparative example.

FIG. 7 shows a measurement result of variations of chromaticity, which are caused by an increase in viewing angle in the black display state. In FIG. 7, the chromaticity is represented by using a CIE 1976 UCS chromaticity diagram. For the purpose of convenience, the rubbing direction shown in FIG. 4 is set to be the vertical direction of the screen, 90° azimuth is the right side of the screen, and 270° azimuth is the left side of the screen. As shown in FIG. 7, the chromaticity of black is different between the case of increasing the viewing angle from the normal direction of the screen toward the right side, and the case of increasing the viewing angle toward the left side.

When chromaticity differences between the chromaticity at the viewing angle of 60° on the right side of the screen and the chromaticity at the viewing angle of 60° on the left side of the screen are |Δv'| and |Δu'|, as shown in FIG. 8, |Δv'| is 0.04 in the present embodiment while |Δv'| is 0.20 in the comparative example, and |Δu'| is 0.018 in the present embodiment while |Δu'| is 0.06 in the comparative example.

As is clear from the above result, it was confirmed that according to the structure of the present embodiment, even if the viewing angle is increased on the right side and left side of the screen, the variation of hue of black display is small, and the asymmetry in hue can be improved.

In the above-described embodiment, the axis angle to the polarizer is adjusted so as to eliminate the effect of the retardation of the second retardation layer R2B at the time of viewing in the frontal direction. The present invention, however, is not limited to this embodiment.

In the above-described embodiment, the second retardation plate is functionally separated into the first retardation layer and the second retardation layer. Alternatively, the second retardation plate may be composed of an optically biaxial retardation layer having a relationship of refractive indices, $nx \neq ny \neq nz$.

In this case, one of the second retardation plates R2 is disposed, for example, such that the direction of the refractive index nx (>ny) is 135° azimuth, and the other second retardation plate R2 is disposed, for example, such that the direction of the refractive index nx (>ny) is 45° azimuth.

The wavelength dispersion characteristics of the retardation Re and retardation Rth are substantially equal to those in the above-described embodiment, and the retardation Re has such wavelength dispersion characteristics as to have a positive inclination and the retardation Rth has such wavelength dispersion characteristics as to have a negative inclination.

In the above-described structure, like the above-described embodiment, |Δv'| was 0.04 and |Δu'| was 0.018.

As is clear from the above-described result, it was confirmed that according to the structure of the present embodiment, even if the viewing angle is increased on the right side and left side of the screen, the variation of hue of black display is small, and the asymmetry in hue can be improved.

The present invention is not limited directly to the above-described embodiment. In practice, the structural elements can be modified and embodied without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

The present invention can provide a liquid crystal display device to which an OCB mode is applied, wherein unwanted coloring of a screen is improved at a time of viewing the screen in an oblique direction, and can provide a liquid crystal display device to which an OCB mode is applied, wherein asymmetry of hue due to the direction of the viewing angle is improved and the display quality is good.

What is claimed is:

1. A liquid crystal display device comprising:
   a liquid crystal display panel which is configured to include a liquid crystal layer held between a pair of substrates, and to which an OCB mode is applied; and
   an optical compensation element which is disposed on an outer surface of the liquid crystal display panel and which optically compensates a retardation of the liquid crystal layer in a predetermined display state in which a voltage is applied to the liquid crystal layer,
   the optical compensation element including:
   a polarizer;
   a first retardation plate which is disposed between the polarizer and the liquid crystal display panel and in which discotic liquid crystal molecules are fixed in a state in which the discotic liquid crystal molecules are hybrid-aligned along a normal direction; and
   a second retardation plate having wavelength dispersion characteristics of $\alpha 1 <1$, when a ratio of an in-plane retardation Re430 at a wavelength of 430 nm to an in-plane retardation Re550 at a wavelength of 550 nm is $\alpha 1$.

2. The liquid crystal display device according to claim 1, wherein when a ratio of an in-plane retardation Re625 at a wavelength of 625 nm to the in-plane retardation Re550 at the wavelength of 550 nm is $\alpha 2$, the second retardation plate has wavelength dispersion characteristics of $\alpha 2 >1$.

3. The liquid crystal display device according to claim 1, wherein wavelength dispersion characteristics of an in-plane retardation Re of the second retardation plate are opposite to wavelength dispersion characteristics of an in-plane retardation Re in the liquid crystal layer.

4. The liquid crystal display device according to claim 1, wherein when a ratio of a thickness-directional retardation Rth430 at the wavelength of 430 nm to a thickness-directional retardation Rth550 at the wavelength of 550 nm is $\beta 1$, the second retardation plate has wavelength dispersion characteristics of $\beta 1 >1$.

5. The liquid crystal display device according to claim 4, wherein when a ratio of a thickness-directional retardation Rth625 at a wavelength of 625 nm to a thickness-directional retardation Rth550 at the wavelength of 550 nm is $\beta 2$, the second retardation plate has wavelength dispersion characteristics of $\beta 2 <1$.

6. The liquid crystal display device according to claim 1, wherein wavelength dispersion characteristics of a thickness-directional retardation Rth of the second retardation plate are equal to wavelength dispersion characteristics of a thickness-directional retardation Rth in the liquid crystal layer.

7. The liquid crystal display device according to claim 1, wherein the second retardation plate is a biaxial retardation plate.

8. The liquid crystal display device according to claim 1, wherein the second retardation plate includes a first retardation layer having refractive index anisotropy corresponding to an A-plate, and a second retardation layer having refractive index anisotropy corresponding to a C-plate.

9. The liquid crystal display device according to claim 1, wherein a slow axis of the first retardation plate is perpendicular to a rubbing direction and a slow axis of the second retardation plate agrees with a transmission axis of the polarizer.

10. A liquid crystal display device comprising:
a liquid crystal display panel which is configured to include a liquid crystal layer held between a pair of substrates, and to which an OCB mode is applied; and
an optical compensation element which is disposed on an outer surface of the liquid crystal display panel and which optically compensates a retardation of the liquid crystal layer in a predetermined display state in which a voltage is applied to the liquid crystal layer,
the optical compensation element including:
a polarizer;
a first retardation plate having a slow axis which is perpendicular to a rubbing direction; and
a second retardation plate having a slow axis which agrees with a transmission axis of the polarizer and having wavelength dispersion characteristics of $\alpha 1 < 1$, when a ratio of an in-plane retardation Re430 at a wavelength of 430 nm to an in-plane retardation Re550 at a wavelength of 550 nm is $\alpha 1$.

11. The liquid crystal display device according to claim 10, wherein when a ratio of an in-plane retardation Re625 at a wavelength of 625 nm to the in-plane retardation Re550 at the wavelength of 550 nm is $\alpha 2$, the second retardation plate has wavelength dispersion characteristics of $\alpha 2 > 1$.

12. The liquid crystal display device according to claim 10, wherein wavelength dispersion characteristics of an in-plane retardation Re of the second retardation plate are opposite to wavelength dispersion characteristics of an in-plane retardation Re in the liquid crystal layer.

13. The liquid crystal display device according to claim 10, wherein when a ratio of a thickness-directional retardation Rth430 at the wavelength of 430 nm to a thickness-directional retardation Rth550 at the wavelength of 550 nm is $\beta 1$, the second retardation plate has wavelength dispersion characteristics of $\beta 1 > 1$.

14. The liquid crystal display device according to claim 10, wherein when a ratio of a thickness-directional retardation Rth625 at a wavelength of 625 nm to a thickness-directional retardation Rth550 at the wavelength of 550 nm is $\beta 2$, the second retardation plate has wavelength dispersion characteristics of $\beta 2 < 1$.

15. The liquid crystal display device according to claim 10, wherein wavelength dispersion characteristics of a thickness-directional retardation Rth of the second retardation plate are equal to wavelength dispersion characteristics of a thickness-directional retardation Rth in the liquid crystal layer.

16. The liquid crystal display device according to claim 10, wherein the second retardation plate is a biaxial retardation plate.

17. The liquid crystal display device according to claim 10, wherein the second retardation plate includes a first retardation layer having refractive index anisotropy corresponding to an A-plate, and a second retardation layer having refractive index anisotropy corresponding to a C-plate.

* * * * *